INVENTOR
SOLOMON ZAROMB

United States Patent Office  3,483,111
Patented Dec. 9, 1969

3,483,111
ELECTROCHEMICAL CELL WITH TIN OXIDE ELECTRODE
Solomon Zaromb, 376 Monroe St., Passaic, N.J. 07055
Filed Oct. 22, 1963, Ser. No. 318,125
Int. Cl. B01k 3/06
U.S. Cl. 204—195                     11 Claims

ABSTRACT OF THE DISCLOSURE

Electrochemical apparatus comprising an electrode made of a porous material selected from the group consisting of glass, quartz, and ceramic wherein the pore surfaces are coated with conductive tin oxide.

---

Figure 1:
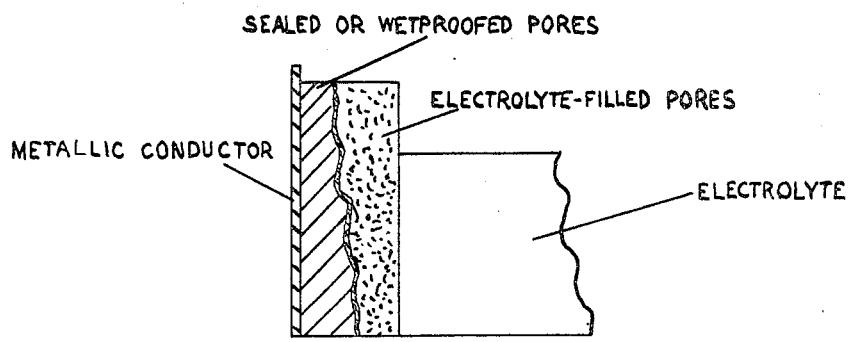

This invention relates to improved inert electrodes in electrolyte systems.

It is an object of the present invention to provide improved inert electrodes for a variety of electrochemical devices and processes.

It is a further object of my invention to provide inexpensive inert electrodes for applications in which costly noble metal electrodes are currently used.

It is also an object of my invention to provide electrodes which remain inert even under relatively drastic conditions where commonly used so-called "inert" carbon or noble metal electrodes undergo appreciable corrosion or rapid oxidation.

According to my invention the aforesaid carbon or noble metal electrodes are replaced by relatively more inert electrodes consisting of conductive oxide-coated refractory, ceramic or glass-like materials such as conductive tin oxide-coated glass or quartz.

Figure 2:
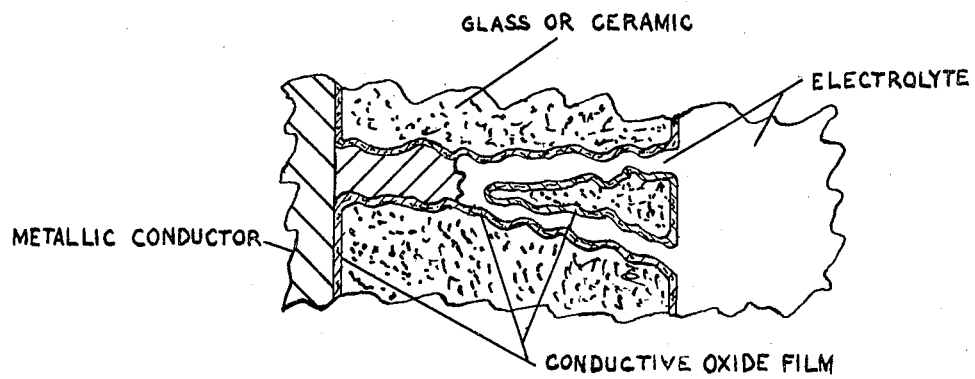

My invention may be understood with reference to the drawing, in which:

FIG. 1 is a diagrammatic cross-sectional view of a porous conductive oxide electrode contacting an electrolyte and a metallic conductor, and FIG. 2 is a magnified diagrammatic cross-sectional view of the internal electrode pore structure.

According to one embodiment of my invention tin oxide-coated glass replaces platinum as the inert indicator electrode in voltammetric apparatus and other electrochemical measuring devices. Besides lower cost, the oxide-coated glass affords an increased voltage-scanning range, especially in the oxidizing region, and can be used in a wider range of electrolyte solutions, including even aqua regia.

I found conductive tin oxide coatings to be inert in most electrolytes even under severe oxidizing conditions where noble metals such as silver, gold or platinum would rapidly dissolve. I thus found tin oxide-coated glass to withstand numerous plating-deplating cycles in concentrated silver iodide-sodium iodide solutions with applied potentials of more than 100 volts and current densities of more than 50 amps/cm.$^2$ without any sign of deterioration. In contrast, films of noble metals such as silver, gold or platinum would rapidly dissolve in the same solutions for applied potentials of less than 3 volts. Furthermore, the conductive tin oxide film can not be easily removed. Only nascent hydrogen generated by violent reduction of concentrated acid or drastic physical treatments such as electric arcing or abrasion seem capable of affecting this remarkably resistant coating.

The transparent or translucent feature of tin oxide-coated glass or quartz electrodes offers additional possible advantages such as improved viewing of an electrode reaction and/or miscellaneous electro-optical arrangements possibly including reversible electroplating such as those disclosed in my co-pending applications Ser. No. 257,988 filed Feb. 12, 1963, now U.S. Patent No. 3,291,551, and Ser. No. 305,171 filed Aug. 28, 1963, now abandoned.

In another embodiment of my invention, fuel cell electrodes for prolonged operation at temperatures above 100° C. in the presence of strong acids are made from porous glass, quartz or ceramic discs. These porous discs are first subjected at a high temperature to a mixture of oxygen and fumes from a concentrated aqueous solution of stannic chloride and hydrochloric acid containing additives such as antimony trichloride, according to known methods of forming conductive tin oxide coatings on glass, quartz, ceramics or refractories. To ensure thorough and uniform penetration of the fumes the porous discs may be first impregnated with the solution and then rapidly heated in air to a maximum temperature of between 400° and 1,050° C. with additional solution applied for a short time after the maximum temperature has been reached. After proper annealing and cooling, the discs may be impregnated with suitable catalysts such as Pt, Pd, Ag and the like, and possibly also with a waterproofing emulsion such as Teflon, according to known impregnation treatments. The treated discs with suitable current-collecting contacts are then readily incorporated in most of the known fuel cell arrangements.

Fuel cells containing hot acids such as sulphuric or phosphoric acid at 150° C. afford direct conversion into electricity of the chemical energy stored in hydrocarbons. However, in the currently used fuel cell electrodes consisting of porous carbon or porous plastic substrates impregnated with noble metal catalysts, severe corrosion of both substrates and catalysts by the hot acids limits the life of the cells. On the other hand, with conducting porous glass substrates the corrosion can affect solely the noble metal catalysts. Furthermore, these catalysts can be redeposited electrolytically on the conductive oxide-coated substrates by occasional application of a plating charge if or as needed. It thus becomes possible, in principle, to extend the fuel cell lifetime indefinitely even in the presence of hot acids.

The same kind of porous conductive oxide electrode can be used, of course in other processes or reactions involving the reverse of fuel cell reactions such as the electrochemical generation of oxygen or chlorine and other gases or halogens.

The conductive oxide electrode can be in the form of a hollow, solid or perforated rectangular, square, triangular, polygonal, circular, elliptical or otherwise shaped plate, cylinder, rod, pyramid, cone, ring or parts thereof or any other desired shape.

One particular embodiment in which a circular or triangular rod or a more complex shape may be desirable pertains to the light modulator systems disclosed in the afore-mentioned co-pending applications Serial No. 57,988, filed Feb. 12, 1963 and Ser. No. 305,171, filed Aug. 28, 1963. For some of these modulators it is desirable to have inert electrode contacts of low electrical resistance and small dimensions. For this purpose, a porous rod with a central capillary hole is first thoroughly coated throughout its internal and external surfaces with conductive tin oxide coating. A metal lead is then inserted into the capillary hole and electrical contact between the metal and the conductive film is assured by impregnating the capillary and pores with carbon and/or metal by various known methods such as impregnating with silver paint or with a silver nitrate-sugar solution and heating at a suitable temperature. The impregnated metal in the external pores adjacent to the areas which are to be exposed to the electrolyte can be removed chemically or electrolytically and these external pores can then be sealed or wetproofed with epoxy resin, Teflon or other suitable sealing or wetproofing agent. The resulting inert electrode has a low electrical resistance, is rigid and sturdy, and can be shaped to close mechanical tolerances.

It is also possible to dispense with the capillary hole by having a metal strip make electrical contact with the conductive oxide rod on the side which is not exposed to the electrolyte, provided that direct contact between the metal and electrolyte in or through the pores be again prevented by partial impregnation of the pores with a suitable sealing or wetproofing agent.

There will now be obvious to those skilled in the art many other electrochemical systems in which conductive oxide electrodes can usefully perform the inert electrode function. These systems will not depart from the scope of the invention as defined by the following claims.

What is claimed is:

1. Electrochemical apparatus comprising an electrode made of a porous material selected from the group consisting of glass, quartz, and ceramic wherein the pore surfaces are coated with conductive tin oxide.

2. Electrochemical apparatus of claim 1 wherein said apparatus is an acid-electrolyte full cell.

3. Apparatus as claimed in claim 2 wherein said electrode is impregnated with a noble metal catalyst.

4. Apparatus as claimed in claim 3 wherein said electrode is impregnated with wetproofing agent.

5. Electrochemical apparatus of claim 1 wherein said apparatus is gas generating.

6. Apparatus as claimed in claim 1 wherein said electrode is impregnated with a material selected from the group consisting of carbon and metal.

7. Apparatus as claimed in claim 1 wherein a metallic conductor makes electrical contact with said conductive oxide.

8. Apparatus as claimed in claim 7 wherein said metallic conductor is protected by a wetproofing agent.

9. Apparatus as claimed in claim 7 wherein said metallic conductor is protected by a sealing agent.

10. Apparatus as claimed in claim 1 wherein said electrode is in the form of a plate.

11. Apparatus as claimed in claim 1 wherein said electrode is in the form of a rod.

References Cited

UNITED STATES PATENTS

| | | | |
|---|---|---|---|
| 2,959,499 | 11/1960 | Herczog et al. | |
| 3,141,835 | 7/1964 | Rolin et al. | 204—1.1 |
| 3,252,839 | 5/1966 | Langer et al. | 136—86 |
| 3,260,620 | 7/1966 | Gruber | 136—86 |
| 2,894,882 | 7/1959 | Strodtz | 204—1.1 |

OTHER REFERENCES

Aitchison, "Transparent Semiconducting Oxide Films," pp. 10–17, 136—238.

JOHN H. MACK, Primary Examiner

T. TUNG, Asistant Examiner

U.S. Cl. X.R.

117—123, 124; 136—86; 204—1, 128, 129, 242, 278, 280, 284, 91